(12) United States Patent
Steinberg et al.

(10) Patent No.: US 12,340,001 B2
(45) Date of Patent: Jun. 24, 2025

(54) METHODS FOR DETERMINING DATA INTEGRITY USING OVERLAPPING REGIONS

(71) Applicant: CTM Insights LLC, Yorktown Hieghts, NY (US)

(72) Inventors: Louis A Steinberg, Yorktown Heights, NY (US); John A Curtis, Austin, TX (US)

(73) Assignee: CTM Insights LLC, Yorktown Heights, NY (US)

( * ) Notice: Subject to any disclaimer, the term of this patent is extended or adjusted under 35 U.S.C. 154(b) by 536 days.

(21) Appl. No.: 17/625,793

(22) PCT Filed: Jul. 10, 2020

(86) PCT No.: PCT/US2020/041502
§ 371 (c)(1),
(2) Date: Jan. 10, 2022

(87) PCT Pub. No.: WO2021/011333
PCT Pub. Date: Jan. 21, 2021

(65) Prior Publication Data
US 2022/0261506 A1   Aug. 18, 2022

Related U.S. Application Data

(60) Provisional application No. 62/874,612, filed on Jul. 16, 2019.

(51) Int. Cl.
*G06F 21/00* (2013.01)
*G06F 21/64* (2013.01)

(52) U.S. Cl.
CPC .................. *G06F 21/64* (2013.01)

(58) Field of Classification Search
CPC .......................... G06F 21/64; H04L 9/0643
See application file for complete search history.

(56) References Cited

U.S. PATENT DOCUMENTS

| | | | |
|---|---|---|---|
| 7,324,662 B2 | 1/2008 | Kot et al. | |
| 7,447,329 B2 | 11/2008 | Choi et al. | |
| 11,734,361 B1* | 8/2023 | Castro Mejía | G06F 16/906 707/740 |
| 2009/0226056 A1* | 9/2009 | Vlachos | G06T 1/0071 382/128 |
| 2018/0349567 A1 | 12/2018 | Kim et al. | |
| 2019/0005268 A1 | 1/2019 | Gupta | |

(Continued)

FOREIGN PATENT DOCUMENTS

CN   104778651 A    7/2015

OTHER PUBLICATIONS

Mirsky et al., "CT-GAN:Malicious Tampering of 3D Medical Imagery using Deep Learning", 28th USENIX Security Symposium.

*Primary Examiner* — Brandon Hoffman
*Assistant Examiner* — Helai Salehi
(74) *Attorney, Agent, or Firm* — David Todd Shoneman; Michael A. Pugel

(57) ABSTRACT

Methods, apparatuses and systems are defined for the efficient identification and location of changes in an electronic file by defining and applying a set of overlapping unique areas within the file. A signature for each unique area or bubble is determined and compared to the signature of the same set of unique areas applied to a target file.

23 Claims, 6 Drawing Sheets

(56) References Cited

U.S. PATENT DOCUMENTS

| | | | |
|---|---|---|---|
| 2019/0158274 A1* | 5/2019 | Tormasov | H04L 9/3239 |
| 2020/0279004 A1* | 9/2020 | Serdy | G06F 16/906 |
| 2020/0279904 A1* | 9/2020 | Seo | H10K 59/131 |
| 2023/0048167 A1* | 2/2023 | Gai | H04L 9/065 |
| 2023/0177216 A1* | 6/2023 | De Gaetano | G06F 16/93 726/26 |

* cited by examiner

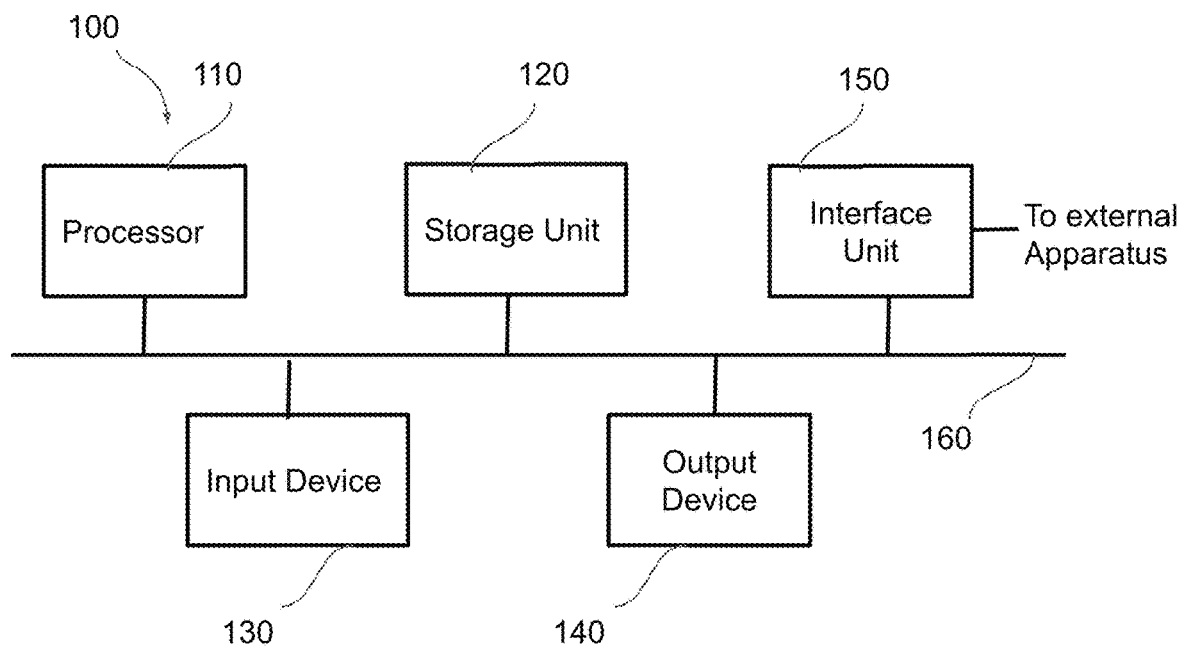
Fig. 1
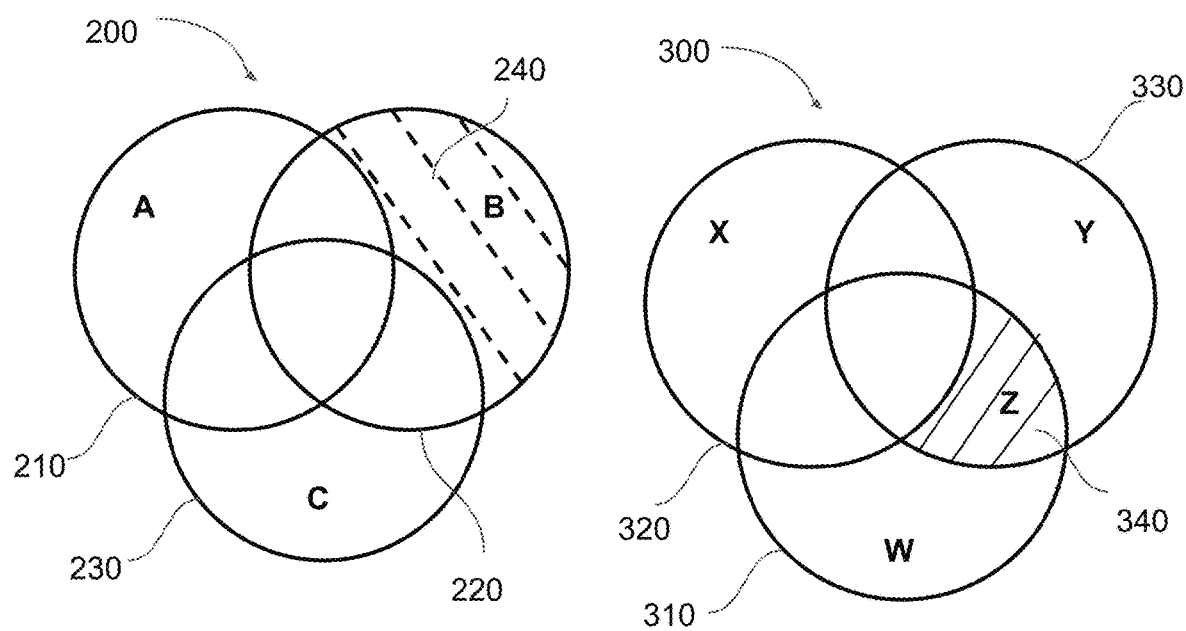
Fig. 2
Fig. 3

| bubble width | overlap width | bubble overlap % | effectiveness |
|---|---|---|---|
| 1000 | 0 | 0% | 1 |
| 1000 | 25 | 3 | 1.079617761 |
| 1000 | 50 | 5 | 1.169570125 |
| 1000 | 75 | 8 | 1.271805503 |
| 1000 | 100 | 10 | 1.388773158 |
| 1000 | 125 | 13 | 1.523591868 |
| 1000 | 150 | 15 | 1.680291026 |
| 1000 | 175 | 18 | 1.864163096 |
| 1000 | 200 | 20 | 2.082292187 |
| 1000 | 225 | 23 | 2.344370434 |
| 1000 | 250 | 25 | 2.664002664 |
| 1000 | 275 | 28 | 3.060877018 |
| 1000 | 300 | 30 | 3.564554074 |
| 1000 | 325 | 33 | 4.221479945 |
| 1000 | 350 | 35 | 5.108948323 |
| 1000 | 375 | 38 | 6.385625622 |
| 1000 | 400 | 40 | 8.267195767 |
| 1000 | 425 | 43 | 11.45032705 |
| 1000 | 450 | 45 | 17.78884639 |
| 1000 | 475 | 48 | 36.22696192 |
| 1000 | 500 | 50 | 666.6666667 |

METHODS FOR DETERMINING DATA INTEGRITY USING OVERLAPPING REGIONS

This application claims the benefit, under 35 U.S.C. § 365 of International Application PCT/US2020/041502, filed Jul. 10, 2020, which was published in accordance with PCT Article 21(2) on Jan. 21, 2021, in English and which further claims the benefit of priority application U.S. 62/874,612, filed on Jul. 16, 2019, which is incorporated herein in its entirety.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure.

The frequency and impact of cyber-attacks have continued to increase as online data and accounts have grown in value. Against this backdrop, the industry has adopted a commonly used model to classify the impact type of an attack called the C-I-A model. The model states that attacks against a system or data contained therein are generally classified in one of three buckets describing the type of impact; Confidentiality, Integrity, or Availability.

This model has worked well to describe attacks. Companies initially experienced a number of data breaches that were attempts to steal data (often to sell it to other bad actors), which represent Confidentiality attacks. After a time, they began to experience attacks against Availability, denying legitimate access to data and systems, to either draw attention to a cause or demanding payment to stop. Early availability attacks were through mechanisms like Denial of Service (DoS) and Distributed Denial of Service (DDoS) and were followed by "Ransomware" that encrypts data and demands payment for the decryption keys.

While attacks against Confidentiality and Availability are now commonplace, companies are just beginning to see attacks against data Integrity. These are likely to evolve rapidly in scope and sophistication.

One common data Integrity attack has been the introduction of false or misleading news stories distributed via social media. Cloud based social media has resulted in easy access to introduce what has been popularly called "fake news". More sophisticated attacks involving "deep-fakes", leveraging Artificial Intelligence (AI) and "Generative Adversarial Networks" (GANs) to manipulate images and video, are creating issues of trust of content. A recent example discussed in the publication "CT-GAN: Malicious Tampering of 3D Medical Imagery using Deep Learning", Mirsky et al, 28th USENIX Security Symposium, 2019 was a proof of exploit in which a team of Israeli researchers demonstrated that they could intercept images from a medical scanner and add or hide indications of cancer. They had a greater than 90% "success" rate in getting radiologists to misdiagnose the disease.

Other forms of data manipulation include, but are not limited to, intentional manipulation of images to mask the misuse of logos or misappropriation of intellectual property (such as copied pictures, artwork, or plagiarized text as described below), subvert Data Loss Prevention (DLP) systems, hide "pfishing" websites, or use steganography to insert hidden data in an otherwise normal looking image.

Additional attacks against the Integrity of "dynamic data" could be extremely impactful. Manipulating data in a database or file could, for example, cause food and medicine to be stored past its safe point of consumption or change the outcome of clinical trials for new drugs. Manipulation could change the data used to train "Machine Learning" Artificial Intelligence (AI) that governs everything from stock trading algorithms to self-driving cars and aircraft. Malware that changes values in databases could wreak havoc on the trust that underpins banking and financial services. In short, data Integrity attacks could undermine societal trust in information driven systems.

Given this, it's clear that new defenses are required to effectively and efficiently highlight data that should likely no longer be trusted. Backups are only effective if we know what to restore and where, driving the need for granular identification of subsets of data that are not trustworthy. This is true for both static data such as medical images and dynamic data which might exist in a database or file, such as a customer list. Without sufficient granularity of detection, entire data sets would have to be marked untrusted (e.g. a full database table instead of a subset) effectively freezing all data at an earlier point in time when a backup was made. Granular identification of suspect data allows for granular restoration, greatly reducing the cost and time of recovery without freezing unaffected data. The commercial impact of losing a large amount of new data entered since the earlier backup may be immeasurable for many companies, institutions and governmental agencies.

SUMMARY

According to one implementation, a method for determining changes in an electronic file in a system comprising at least one processor in communication with at least one storage resource is described. The method includes determining, based on at least one of user input and computed characteristic, a set of bubbles that are applied to an initial electronic file, the set of bubbles include at least two of the bubbles overlapping. The method further includes determining a first signature for at least one of the bubbles applied to the initial electronic file, copying the signature for the at least one of the bubbles into at least one storage resource, accessing a target electronic file, and applying the set of bubbles to the target electronic file. The method further includes determining a second signature for the at least one of the bubbles in the set of bubbles applied to the target electronic file and determining at least one region of change in the target electronic file by identifying at least one of the bubbles in the set of bubbles having a difference between the second signature and the first signature.

According to another implementation, a method for identifying a target electronic file that is similar to an initial electronic file in a system comprising at least one processor in communication with at least one storage resource is described. The method includes determining, based on at least one of user input and computed characteristic, a set of bubbles that are applied to the initial electronic file, the set of bubbles including at least two of the bubbles overlapping. The determining includes establishing a first threshold number and a second threshold number associated with the set of bubbles that is applied to identify one or more target electronic files that are similar to the initial electronic file. The method further includes determining a first signature for at least one of the bubbles applied to the initial electronic file, copying the signature for the at least one of the bubbles into at least one storage resource, accessing the target electronic file, and applying the set of bubbles to the target electronic file. The method further includes determining a second signature for each one of the bubbles in the set of bubbles applied to the target electronic file and determining if the difference between the first signature and the second signature for each one of the bubbles is less than the first threshold number and if the number of bubbles with a difference between the first signature and the second signature is less than the second threshold number. When an exact match is desired between bubbles, the first threshold may be set to 0.

According to another implementation an apparatus for determining changes in an electronic file having at least one processor in communication with at least one storage resource and a computer-readable storage medium having stored instructions is described. The stored instructions when executed by at least one processor causes the at least one processor to determine, based on at least one of user input and computed characteristic, a set of bubbles that are applied to an initial electronic file, the set of bubbles including at least two of the bubbles overlapping. The instructions further cause the processor to determine a first signature for at least one of the bubbles in the set of bubbles applied to the initial electronic file, copy the signature for the at least one of the bubbles into at least one storage resource, access a target electronic file, and apply the set of bubbles to the target electronic file. The instructions further cause the processor to determine a second signature for the at least one of the bubbles in the set of bubbles applied to the target electronic file and determine a region of change in the target electronic file by identifying at least one of the bubbles having a difference between the second signature and the first signature.

According to another implementation, a system for efficiently storing a representation of an initial electronic file is described. The system includes at least one storage resource in communication with at least one processor. The at least one processor is configured to receive or access and store at least a first set of signatures that is determined from a set of bubbles that are applied to the initial electronic file, the set of bubbles including at least two bubbles overlapping. The first set of signatures requires less storage space than the initial electronic file and the first set of signatures cannot be reversed to reconstitute the original initial electronic file. The at least one processor is further configured to receive or access a target electronic file and determine a second set of signatures based on the set of bubbles. The at least one processor is additionally configured to determine if at least one of (a) at least one signature from the second set of signatures materially differs from at least one corresponding signature from the first set of signatures and (b) a number of signatures from the second set of signatures that materially match signatures from the first set of signatures is greater than at least one of a user determined percentage and a computed percentage.

BRIEF DESCRIPTION OF THE DRAWINGS

The above and other aspects, features, and advantages of the present disclosure will become more apparent in light of the following detailed description when taken in conjunction with the accompanying drawings to which the principles of the present disclosure are applicable:

FIG. 1 is a block diagram illustrating an exemplary computing device used for determining integrity of an electronic file using overlapping regions;

FIG. 2 is a diagram of an exemplary arrangement of bubbles associated with data in an electronic file;

FIG. 3 is a diagram of another exemplary arrangement of bubbles associated with data in an electronic file;

DETAILED DESCRIPTION

Figures 4, 5:
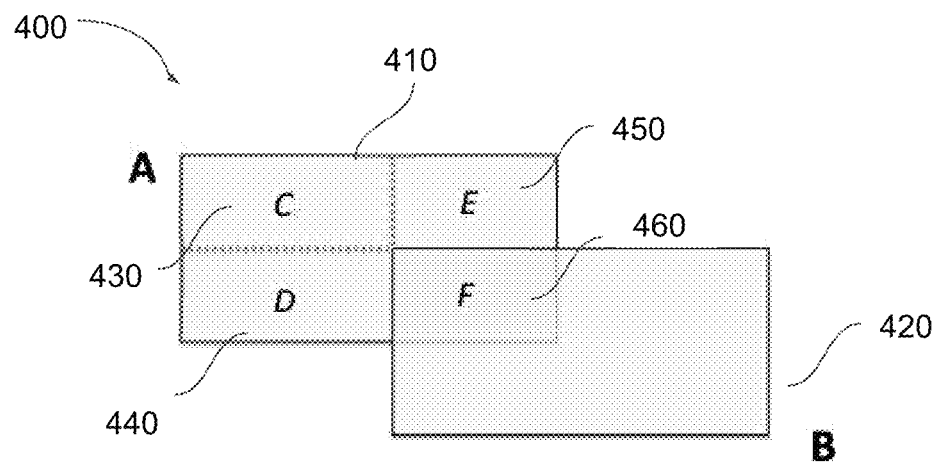
FIG. 4 is a diagram of a further exemplary arrangement of bubbles associated with data in an electronic file.
FIG. 5 is a block diagram of an exemplary data table of records stored in an electronic file including an arrangement of bubbles associated with the records in the data table.

It should be understood that the elements shown in the figures may be implemented in various forms of hardware, software or combinations on one or more appropriately programmed general-purpose devices, which may include a processor, memory and input/output interfaces. Those skilled in the art will be able to devise various arrangements which, although not explicitly described or shown herein, embody the principles of the disclosure and are included within its scope.

All examples recited herein are intended to aid the reader in understanding the principles of the disclosure and the concepts and are to be construed as being without limitation to such specifically recited examples and conditions. Any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "module" or "controller" should not be construed to refer exclusively to hardware capable of executing software, and may implicitly include, without limitation, a System on a Chip (SoC), digital signal processor ("DSP") hardware, read only memory ("ROM") for storing software, random access memory ("RAM"), and nonvolatile storage.

This application, and the underlying concepts, define several new solutions to the emerging problem. One embodiment defines a new way of using hashes or signatures on subsets of data within a file or image to efficiently identify, locate and/or detect (collectively, "detect") an area that has potentially changed. These subsets are referred to as "bubbles" and are selected so as to intentionally overlap.

With overlapping bubbles, there will likely be parts of a first bubble whose signature changed that intersect or overlap with one or more parts of bubbles whose signatures remain unchanged. In such a situation the overlapping portion(s) of the first bubble can be removed as no longer suspect.

Rather than having a single signature for a large data set which lacks granularity, or a large number of independent signatures which consume resources to store and process, creating signatures on overlapping regions allows for substantially more granular identification of suspect regions without the inefficiency of having many more non-overlapping signatures. These efficiencies are described below. The size, shape, placement, and overlap of bubbles can be adjusted to balance granularity with efficiency. A user, administrator or computer algorithm can select the number of bubbles, their shapes, sizes, and placements, to maximize overlap in the most sensitive files or portions of files while minimizing the total bubble count. Minimizing the bubble sizes increases the bubble count, which results in more signatures to store, but provides smaller areas in which to detect that a change has occurred. Larger bubbles with more overlapping regions can achieve a similar result without as many signatures In some embodiments, the data can first be normalized to remove deviations that are unimportant. For example, a picture can be compared against the signatures of an initial picture with a different size, color palate, or compression (examples of what are collectively called "parameters"), but both still could be considered as matching if an observer cannot perceive the difference. By applying a normalization process to the initial file before computing signatures of bubbles, and using the same normalization for a compared file, one can ignore differences that are not of interest.

Additional filtering of unimportant differences can be accomplished through the algorithm used to compute and compare signatures. If a perfect match is desired, the signature can be a cryptographic hash across the data in a bubble. An example of such data is the values of the red, blue, and green pixels in an image. In cases where it is desirable to filter out additional noise induced by minor edits, such as image cropping or parameter changes, an algorithm can be chosen that computes similar signatures when the bubbles are considered similar. The difference between the original signature and a comparison one can then be thresholded using a concept called "hamming distances". One example of this is, if a single pixel's color were to change or be cropped, the resulting signature would be mathematically close to the original signature, and their difference could be considered small enough to ignore.

Similarity matching allows for comparisons that are similar but not identical across a single bubble or a collection of bubbles that represent a file. In the latter case, we can efficiently identify images or documents which are similar to an original even if they have minor modifications, without storing the original file in its entirety. This yields a significant storage and performance improvement over image search systems which need to store the original file to be returned. When applied to images or text, for example, applications include but are not limited to image search, logo misuse, commercial intellectual property theft, detection of pfishing web sites (based on the reuse of images), registration of camera pictures to ensure integrity, and similar registration of medical images. Similarity matching can also be applied to text, in which signatures are computed across bubbles representing regions of text characters in a document. This is useful for such applications as plagiarism detection and Data Loss Prevention (DLP) systems which scan outgoing messages to detect the exfiltration of sensitive data strings.

In some embodiments, signatures need not be computed across all data in a file. This may be advantageous for a database or file that is comprised of dynamic data. Such dynamic data may include portions that are static (such as fields in a database that are unlikely to change over time) or may be new static data values (called "watermarks") that are inserted. In such an example, one might calculate the signature of a bubble across just the static data. This allows the remaining data to legitimately change while creating "tripwires", represented in FIG. 7 by the letter "T", each of which signal an unexpected change in a bubble. Again, the placement and density of these tripwires as well as the bubbles in which they are contained can be adjusted for efficiency and granularity of detection.

While normalizing files for consistency and the use of thresholded hamming distance can be used to ignore immaterial variation between compared files, more substantial variation caused by actions like excessive cropping (with or without resizing) can also be accounted for and normalized through the use of one or more techniques. These include, but are not limited to, scanning the second file for groups or "clusters" of bubbles whose signatures materially match similar groups of signatures in the initial file; identifying defining characteristics (such as brightness, color, or the presence of sharp contrast "edges") within certain locations in the initial file and storing them or their locations with the bubble signatures representing the initial file; drawing "vector" lines between the stored locations of defining characteristics in the initial electronic file and later comparing their number, angles, and lengths to similar "vector" lines between locations containing similar defining characteristics in the target electronic file, and computing an algorithmic representation (such as a "2D Cosine Transformation" or "Fourier Transformation") of the initial electronic file or of defining characteristics in said initial electronic file, then later searching for a similar set of values or characteristics in the target electronic file. In some embodiments, the algorithmic representation will create a two dimensional waveform, represented as a polynomial, that represents a group of bubbles in the target electronic file defining characteristics as described previously, and that can be used to search for a similar waveform in the initial electronic file to understand if the target electronic file has been cropped and where.

FIG. 1 is a schematic block diagram illustrating an example of a computing device 100 for determining integrity of an electronic file using overlapping regions according to an embodiment of the present disclosure. The computing device 100 includes a processor 110, a storage unit 120, an input device 130, an output device 140, and an interface unit 150 which are connected together electrically or otherwise coupled together by a bus 160. Of course, constituent elements of the computing device 100 may be coupled together by a mechanism other than a bus connection using the bus 160.

The processor 110 controls operations of the computing device 100. The storage unit 120 stores at least one program to be executed by the processor 110, and various data, including for example images and files along with data associated with those images and files and used as part of computations performed by the processor 110. The storage unit 120 may also store intermediate data of computations performed by the processor 110, and so on. The processor 110 is formed by any known and suitable hardware, or software, or a combination of hardware and software. For example, the processor 110 is formed by dedicated hardware such as a processing circuit, or by a programmable processing unit such as a Central Processing Unit (CPU) that is used to execute a program stored in storage unit 120 thereof.

The storage unit 120 is formed by any suitable storage or means capable of storing the program, data, or the like in a computer-readable manner. Examples of the storage unit 120 include non-transitory computer-readable storage media such as semiconductor memory devices, and magnetic, optical, or magneto-optical recording media loaded into a read and write unit. The semiconductor memory devices may include but are not limited to, RAM, ROM, Electrically-Erasable Programmable ROM (EEPROM), and flash memory.

The input device 130 may include one or more input elements that may be used by a user for entering data and/or control operation of computing device 100. The one or more input elements include, but are not limited to a keyboard, a mouse, a trackball, microphone, a touch panel, and the like.

The output device 140 may include one or more output elements that may be used by a user to retrieve and consume information received and/or processed by computing device 100. The one or more output elements include, but are not limited to, a display unit, a speaker, a vibratory unit, and the like.

The interface unit 150 provides an interface between the computing device 100 and any external apparatus. The interface unit 150 may be communicable with the external apparatus via cable or wireless communication medium using one or more communication protocols. The communication protocols include, but are not limited to, IEEE 802.3 (Ethernet), IEEE 802.11, cellular 3G, cellular 5G, and the like.

In operation, the storage unit 150 stores instructions for processor 110, such as in the form of a program. The instructions, when read out of storage by processor 110, causes the processor 110 to determine a set of overlapping bubbles that will be applied to data contained in or associated with an initial electronic file. The initial electronic file may be accessed or received from another external device through interface unit 150 or may be accessed or retrieved from storage unit 120, in some cases, based on input from a user through input device 130. One or more of the bubbles applied to the initial electronic file have some region of overlap with other bubbles. The processor 110 further determines or computes a signature for one or more of the bubbles, which include the overlapping bubbles. The signatures along with information associated with application of the bubbles can be copied into and stored in storage unit 120. The use of signatures for a bubble arrangement having overlapping bubbles can require less storage space than the initial electronic file. Further, in some cases, the set of signatures cannot be used (such as by reversing or inversion) to reconstitute the original or initial electronic file. The processor 110 can additionally apply the arrangement of bubbles to a target electronic file, in some cases accessed or received from an external device through interface unit 150 at a later time. The processor 110 further determines or computes another, new or second, signature for one or more of the bubbles applied to the target electronic file. In an embodiment, processor 110 determines or computes signatures for the same one or more bubbles as for the initial electronic file. In another embodiment, the computation of second signatures for comparison is performed by a different processor from the processor 110 that calculated the first signatures.

Processor 110 further detects and/or identifies instances where the second signature differs from the first signature in order to determine one or more regions of change between the target electronic file and the initial electronic file. Additionally, a processor may identify a portion of a first bubble that is overlapping a portion of a second bubble applied to both electronic files. Processor 110 may determine this overlapping portion as being or not being a region of change depending on whether some difference between the first and second signatures for one or both of the first and second bubbles is present. It is worth noting that the mechanism of creating and comparing signatures of bubbles applied to the initial electronic file and the target electronic can be effective even if only using a signature for one bubble. However, creating and comparing signatures for more than one bubble may improve the ability to further isolate the region of change of an electronic file.

Although only one processor 110 is shown in the exemplary computing device 100, it must be understood that such a processor may include different modules and units performing or may be embodied by more than one processor in to implement the functions carried out by computing device 100 according to embodiments of the present disclosure.

Bubbles are created which represent portions of an image, file, database, or other set of data (collectively a "file" or "initial electronic file") stored in memory (such as RAM) or on a hard drive or any other appropriate storage device (collectively "storage resources"). In some embodiments, the storage may be a locally attached disk, in others it may be remotely accessed over a network from cloud storage or a standalone hard drive or other physical storage device. The bubbles are selected by a user, administrator, or software so as to intersect and overlap with one or more other bubbles as shown and described in FIG. 2. FIG. 2 illustrates an exemplary arrangement 200 of bubbles 210, 220, and 230 (labelled A, B, and C respectively) and having overlapping regions as well as non-overlapping regions. Bubbles can also be fully contained in other bubbles. A hash, checksum or similar number (collectively, a signature) is created for each bubble based on some or all of the contents of said bubble. This can be stored to later detect an indication of at least one change to the bubble. The storage of said signatures is more efficient than storing a full copy of the file.

In a preferred embodiment, the storage or persistence of said signatures may be held remotely from the file. In many implementations, this collection of signatures will also include information or characteristics about the bubbles themselves, such as their placement and size(s), the algorithms used to generate their signatures, etc. to facilitate later comparisons with a file to be tested for potentially unauthorized changes.

Bubbles need not be a specific shape, nor do they need to be uniform in size. For simplicity, we may show them as ovals, but in many implementations, they will be parallelograms and in one embodiment rectangles as shown in FIG. 4. They can also be any other regular or irregular shape. Adjusting the amount of overlap of bubbles can be accomplished by varying their shapes as well as their sizes and placements. This has particular value in a file with potentially varying degrees of sensitivity For example, the center of a medical scan image may be more important than the borders, the text of a document more important than the table of contents, or some columns of a database may be more important than others in terms of being able to granularly detect unauthorized changes. Finally, it may be desirable to randomize the placement, sizes, shapes and overlap of bubbles to keep an attacker from determining which areas of a file have minimal bubble coverage or overlap; knowledge of the bubble attributes could let said attacker determine what parts of a file to compromise which would result in less granular detection.

In some implementations, a signature will also be computed on a bubble that represents the entire file. This is useful, for example, if portions of the file are not represented by any other bubbles, perhaps due to the shape and/or placement of bubbles. In another example, a signature may be computed across the entire file's bubble as a first comparison to determine if checking the signatures of smaller bubbles contained therein is warranted.

When a user or program wishes to test a file for an unexpected change it loads information about the sizes, shapes, and placements of bubbles in the original version of that file, along with the previously calculated signatures. It then computes the signature for each bubble in the new file and identifies which have changed ("bad bubbles") and which have not ("good bubbles"). Any region of overlap in which a good bubble intersects with a bad bubble is known to be good, thereby reducing the bad bubble area that is suspect without the need for more signatures to achieve this same level of granularity. By repeating this process of removing good intersecting regions from bad, one or more suspect regions can be identified in the file. Again, referring to FIG. 2, if Bubble 220's signature has changed, but the signatures for Bubbles 210 and 230 have not, then only the shaded portion of Bubble 220 that does not intersect, indicated as segment 240 of Bubble 220, is now suspect.

Just as the intersection of a good bubble with a bad creates a region of the bad bubble that is known to be good, some implementations may choose to use the overlapping regions of 2 or more bad bubbles to highlight a region that is more highly suspect than a bad bubble region that doesn't overlap with other bad bubbles. While there is no guarantee that the overlapping region contains the change(s), it may be thought of by some as more suspect. One benefit of this is to identify a smaller portion of the file for closer inspection. FIG. 3 illustrates another exemplary arrangement 300 of bubbles 310, 320, and 330 (labelled W, X, and Y respectively) and having overlapping regions as well as non-overlapping regions similar to FIG. 2. If Bubbles 310 and 330 both have detected signature changes, some implementations will choose to highlight the overlapping region 340 (labelled Z) as more likely to contain the change. This is not guaranteed as it's possible that there were separate changes in each of Bubble 310 and 320 that are not in region 340 (and not in Bubble 320, which is shown to be good). In this case, the portions of bubbles 310 and 330 which do not intersect with Bubble 320 are considered bad (or suspect) and region 340 is considered more suspect.

While bubbles can be any shape, in some embodiments it may be preferred to use rectangles for multiple reasons that will become clear. FIG. 4 illustrates a further arrangement 400 of bubbles 410 and 420 (labelled A and B respectively and having an overlapping region 460. Bubbles 410 and 420 are both shown as rectangular in shape. One advantage of rectangles is to simplify the removal of a region when a good bubble overlaps with a portion of a bad bubble. Subtracting overlap of ovals, such as shown in FIG. 2, leaves an irregular shape. While any shape can be described mathematically, the processing can be simplified when the bubbles are rectangles through a process called splitting. Again, returning to FIG. 4, we can create an example in which Bubble 410 is a bad bubble and bubble 420 is a good bubble. We therefore need to subtract the intersection region 460 (labelled as F). An efficient way to do this is to split bubble 410 into 3 newly created bad bubble regions 430, 440, and 450 (labelled C, D, and E respectively). Region 460 is discarded as that good bubble region is wholly contained in Bubble 420, which is already known to be a good bubble. In splitting, all bubbles retain the shape of rectangles, and the process can repeat with other good bubbles that may intersect with newly created bad Bubble regions 430, 440, and 450. Careful observers will note that the number of split bubbles can actually be reduced by not separating bubble region 430 from either bubble region 440 or bubble region 450 (creating just two bad bubbles: regions "430+440" and 450 or regions "430+450" and 440.

As mentioned above, signature algorithms can be computed that allow for bubbles which are substantially similar to be considered the same. Examples of these include color clustering, color averaging, or histogram binning with color palates such as RGB, HSV, or LAB. This is useful, for example, when attempting to match a file against previously stored signatures (representing previously registered files). In addition to testing the percentage of bubble signatures that match, which indicates the similarity between one file and another, such a system can ignore minor deviations between bubbles that should be considered matches. In one example, signatures of an image may be registered with a data repository service. An image may be presented which is a derivative of a registered image (that is, the original has had signatures stored in the repository). The derivative image may have been, for example, saved with different parameters such as the level of compression or different colors, it may have been resized, or it may have been cropped. These changes may not materially change how an observer perceives the derived image. By using a signature generating algorithm that computes numerically near values based on the level of perceptible change, minor differences can be thresholded and ignored (using "hamming distances") while major differences still indicate that the bubble has changed in a material way. That is, the signature generating algorithm may be selected to minimize minor differences. The determination of the level that constitutes a minor difference may be selected by a user or determined algorithmically based on at least one of the submitted file and the user's preferences.

In some embodiments, the signature generating algorithm used, threshold value to be tested, or the bubble characteristics (such as size, shape, and location) may be selected when the bubbles are first created, based on the content of each bubble. This allows for additional improvements in ignoring what are considered minor differences by adjusting the sensitivity to change based on the data in a bubble or a portion of the initial electronic file.

One embodiment of the above might ignore changes in image resolution or compression created by an image editor such as "Adobe Photoshop" or "Microsoft Paint", while still preserving the ability to find similar images in a repository and to highlight changed regions therein. In such an embodiment, signatures representing an image might be registered in a repository when a camera takes a picture. When an image is later presented to a user or application (such as a news feed), the registration repository can be checked for substantially similar images by treating similar bubbles as effectively matching and identify bubbles or portions of bubbles with material changes. If the later derived image has been materially altered, for example by changing a soft drink bottle to a beer bottle, and in the process of creating the derived image the resolution is changed, the original image's signatures can still be found in the repository (ignoring minor changes to many bubbles introduced by the resolution change). The change to the bottle would still be highlighted.

In some embodiments, files can be normalized before creating bubble signatures for registration and comparison. For example, a standard set of colors and resolution might be applied. This can have the effect of further reducing the number of bubbles that have only a minor or no material change between the original file and a later version.

There are several advantages to storing signatures in a repository that represent a file. While the obvious one is the efficiency of a smaller file using less storage space, additional benefits include privacy and security. One such benefit is that a sensitive document or image, which is only represented by signatures, can now be given to a less trusted service for registration or comparison. The signatures are computed and only they are transferred, while preserving the ability to match similar files and/or highlight meaningful changes.

One obvious impediment to using signatures is encountered with files that are expected to frequently change, for example records in a database. While bubbles can be defined that encompass database records, the signatures would need to be recomputed frequently for those bubbles containing validly changed, inserted, or deleted records. In some embodiments it may be preferable to insert values such as the shade of an image pixel or data in a database that are not expected to change, called "watermarks". Inserted watermarks in a dynamic file, such as a database, need not be full records. For example, the inserted data may be a watermark character (or characters) into one or more existing records. FIG. 5 shows an example of a database table 500 in which an extra character has been inserted as a watermark into a fixed position within each column of data records, and signatures based on a signature generating algorithm computed across overlapping sets of bubbles 510 and 520 associated with the columns containing these watermarks. In cases, such as in FIG. 5, where a bubble encompasses a group of characters at a fixed position within a single database column, the shape of the bubble is considered a line.

Signatures are computed whenever rows are added to or deleted from a bubble set 510 or 520. The system preserves the values of the inserted watermark characters so that the watermark characters (and therefore signatures) do not change when records are legitimately updated. When an unauthorized party changes a record, they do not know the position of the watermark characters (or even if the watermark characters exist) and their unauthorized changes to records will likely result in changes to the watermark characters (and therefore the signatures of bubbles 510 and 520 containing the watermark characters).

Figure 6A:
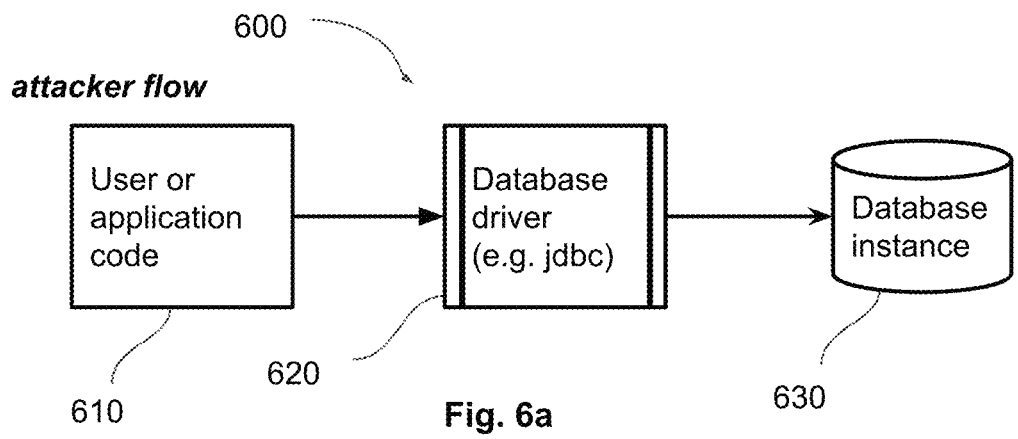
FIGS. 6a and 6b are block diagrams illustrating exemplary workflows used for determining integrity of an electronic file using overlapping regions.
Figure 6B:
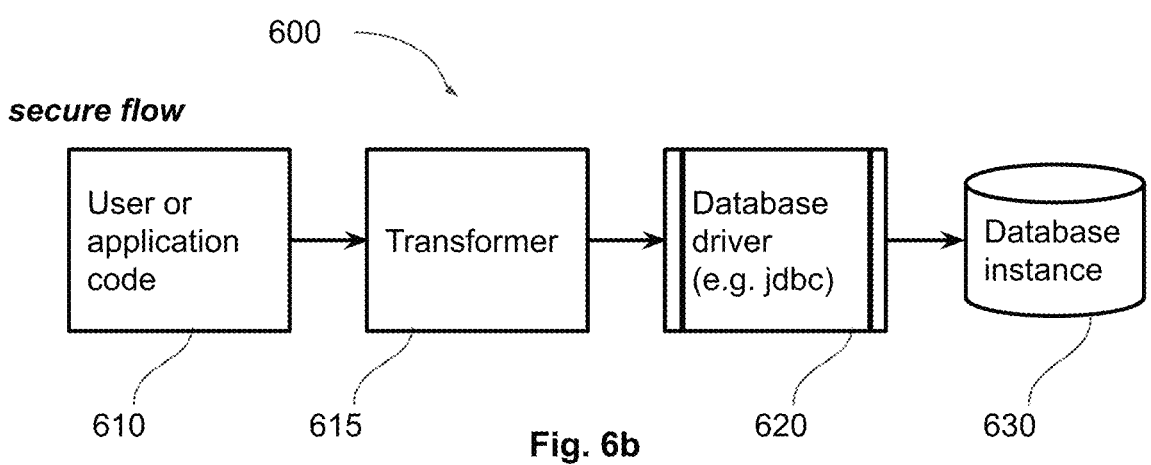

FIG. 6a and FIG. 6b show representative workflow diagrams 600 for a system of activity that implements this functionality to determine the integrity of an electronic file using inserted watermarks and overlapping regions. Both FIG. 6a and FIG. 6b include an element 610 representing a user or application, an element 620 that operates as a database driver, such as java database connectivity (JDBC) or similar, and a storage element 630 for maintaining an instance of data (e.g., a file such as a transaction log or database table structure) in the database communicatively coupled together serially and bidirectionally. FIG. 6b further includes a transformer element 615 coupled between element 610 and element 620. The workflow in FIG. 6b shows that the legitimate or trusted application in element 610 calls a transformer function in transformer element 615 instead of interfacing directly with the database driver in element 620. The transformer function's purpose is to insert watermark characters in newly created records, to preserve the values of these characters when a record is legitimately updated, and to hide the watermark characters from the application code when values are fetched. The transformer function also triggers a re-computation of the appropriate bubble or bubbles signature(s) when a record is inserted or deleted. In contrast to FIG. 6b, the workflow in FIG. 6a shows how a typical attacker, using different application code without access to the transformer function in transformer element 615, would access the records in the storage element 630 containing the watermark characters and would neither know that one of the characters is a watermark nor take steps to preserve the watermark character values when making a change to a value in a record.

In other embodiments, it may be preferable to not modify the file by inserting watermark characters, instead identifying existing data values that are not expected to change. For example, in a database, a customer's address may be expected to change over time but his/her Social Security or similar national identity number would not.

Inserted watermarks or existing static data are collectively called "tripwires". Any change to the tripwires indicates unauthorized manipulation. Bubbles are defined so that they contain one or more tripwires. The signature of a bubble is then taken across only the tripwires contained in that bubble, creating a stable set of signatures. An attacker who cannot distinguish between real data and tripwire data runs the risk of changing a tripwire, with more changes making this more likely. Creating tripwires by inserting watermark characters allows one to control both the density of tripwires (improving the likelihood of detecting an unauthorized change) as well as their distribution, but at the cost of increasing the size of the file. Tripwire placement can be randomized to further frustrate an attacker. In some embodiments, techniques such as steganography can be used to hide embedded watermarks that are inserted, making it appear as a legitimate part of the file's data.

Figure 7:
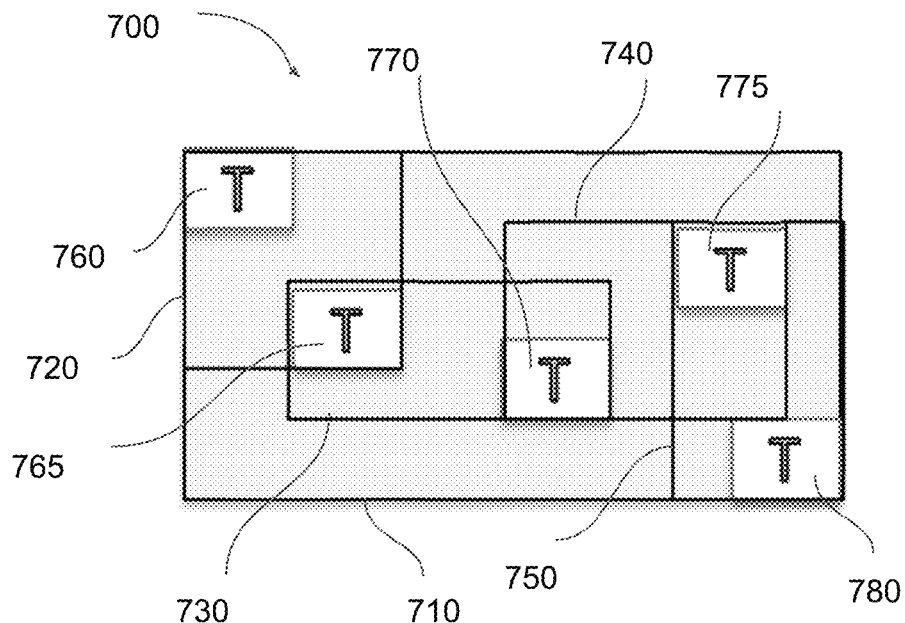
FIG. 7 is a diagram of yet another exemplary arrangement of bubbles associated with data in an electronic file.

The use of tripwires presents another simplification when the shapes of bubbles are rectangles. FIG. 7 illustrates a diagram of another arrangement 700 of bubbles according to aspects of the present embodiments. Bubbles 720, 730, 740, and 750 each encompass a region of bubble 710. Further, bubbles 720 and 730, 730 and 740, and 740 and 750 include separate overlapping regions. While any shape can be defined which contains tripwires, the tripwires can efficiently define corners of bubbles as shown in FIG. 7. This is true whether tripwires are added watermarks or simply identified as infrequently changing data. In FIG. 7, a set of tripwires 760, 765, 770, 775, and 780 are shown and labelled with a "T". Each bubble 710, 720, 730, 740, and 750 contains tripwire data which was either inserted or identified as unlikely to change frequently (both as described above). In this example, each bubble effectively has two tripwires used to define the shape, size, and position of the bubble in the file by making them corners of a rectangle. Accurately defining a shape such as an oval using watermarks is possible, though either more complex or the edges of the shape are less obvious.

Figure 8:
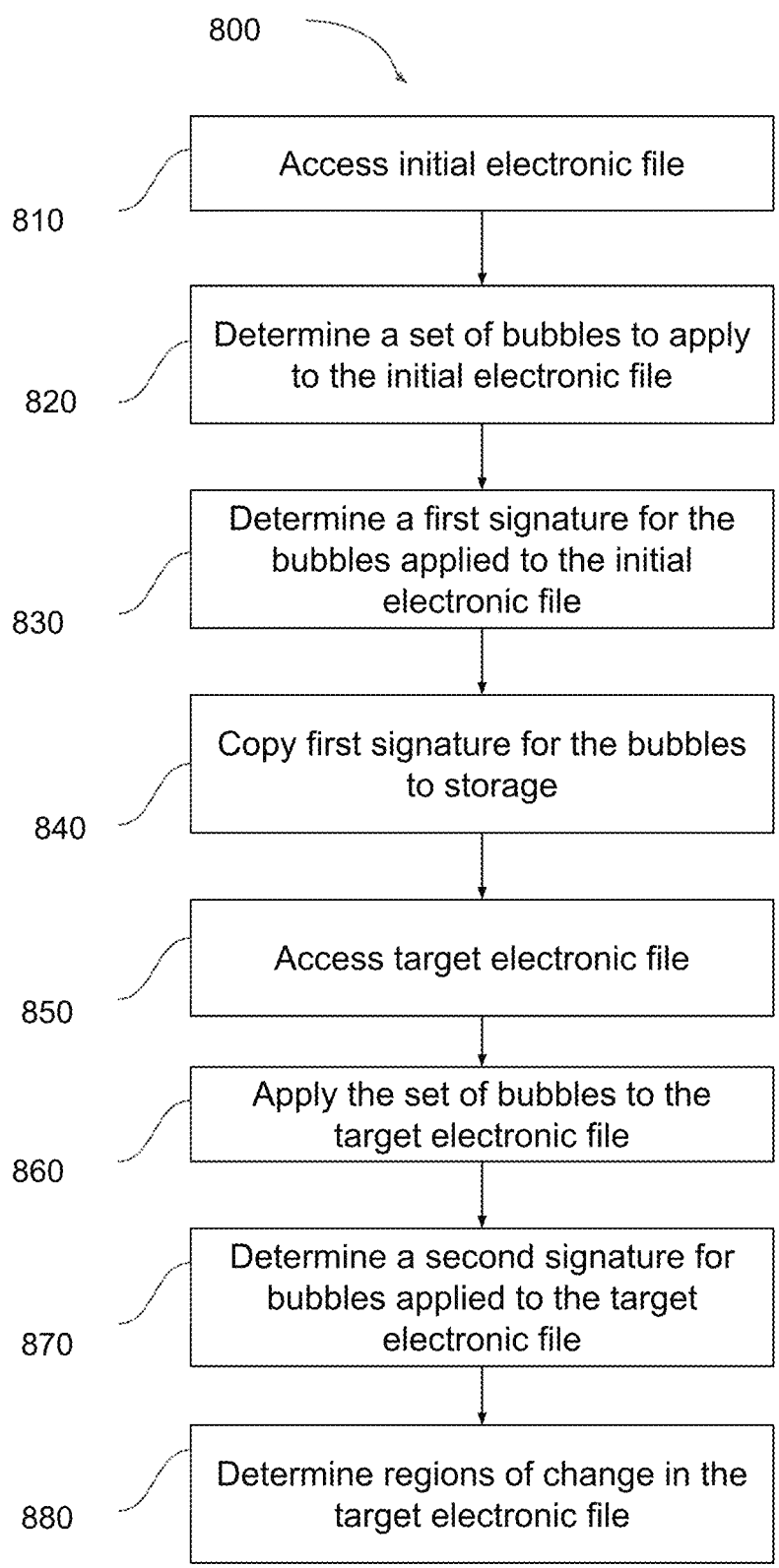
FIG. 8 is a flow chart illustrating an exemplary process used for determining integrity of an electronic file using overlapping regions.

FIG. 8 is a flow chart for an exemplary process 800. Process 800 is primarily described with respect to computing elements, such as computing device 100 described in FIG. 1. Process 800 may also be performed by one or more devices that operates within a system similar to system 600 described in FIG. 6a and FIG. 6b. Although process 800 depicts steps performed in a particular order for purposes of illustration and discussion, the operations discussed herein are not limited to any particular order or arrangement. One skilled in the art, using the disclosure provided herein, will also appreciate that one or more of the steps of process 800 may be omitted, rearranged, combined, and/or adapted in various ways.

At step 810, an initial version of a file, such as an electronic file or image, is accessed. The initial version of the file may be retrieved from a local memory (e.g., storage unit 120) or may be retrieved from an external device through a communication interface (e.g., interface unit 150). The initial version of the file is typically considered as the original or source file and may be further identified as the initial file.

At step 820 a determination is made regarding applying an arrangement of a set of bubbles to the received initial file. In some embodiments all of the bubbles include overlapping regions. In some embodiments, the arrangement of the bubbles is generated by a user through a user interface (e.g., input device 130). In some embodiments, an automatic or semi-automatic computer-controlled process may be implemented for arranging the bubbles. The shape of the bubbles may include, but is not limited to, circular, triangular, rectangular, and the like. In some embodiments, where data is arranged in a line, the shape may be considered linear. In some embodiments, the bubbles may be a parallelogram in shape to allow for more efficient processing of the bubbles and overlap regions during subsequent detection and identification as part of determining integrity of the electronic file, as described above.

At step 830, one or more signatures associated with the set of bubbles applied to the initial file are determined or computed. Generally, only one signature is determined per bubble but other variations are possible. Additionally, a minimum of one signature associated with one bubble is determined but more signatures associated with more bubbles, including overlapping bubbles may also be determined. The computation may be performed in a processing element of a single device (e.g., processor 110) or may be distributed across more than one processing element in the single device or in multiple devices connected through a communication network. The one or more signatures are determined or computed based on the data contained in or encompassed by the set of bubbles. In some embodiments, the selection of the signature algorithm may be based on the content of the bubbles and stored with the bubble signatures. In some embodiments, additional information, such as watermarks or tripwires as described above, can be added to the data prior to computing the signatures. For instance, the one or more signatures determined, at step 830, may be calculated using only tripwire data contained within a bubble. In some embodiments a normalization process may be applied to the initial file at a time before computing the first signatures, at step 830.

It is worth noting that in some embodiments, the determination of the arrangement of bubbles, at step 820, may include selecting one or more characteristics to retain the efficiency of locating and/or detecting a change between the initial file and a subsequent version of the file by balancing the granularity of the set of bubbles and the number of signatures that are calculated and stored. The characteristic may be selected from a list of characteristics including, but not limited to, size, shape, placement, density, and percent overlap of the individual bubbles. For example, each bubble may be a parallelogram in shape that efficiently allows for the removal of a portion of a first bubble that overlaps a portion of a second bubble. In some embodiments, bubble characteristics may be selected based on the content of the bubbles and stored with the bubble signatures. Further, the selecting a characteristic may also include varying at least one characteristic of at least one of the individual bubbles. In some embodiments, tripwires may be incorporated into, and used to determine, some or all of the bubbles.

At step 840, the one or more signatures for the bubbles applied to the initial file are copied and stored into a memory or storage unit in a device (e.g. storage unit 120). In some embodiments, the resources used for storing the first signatures may be configured to receive and store the one or more signatures for the bubbles so that the set of first signatures requires less storage space than the original initial electronic file. Furthermore, the signatures can be selected so that they cannot be used (e.g. reversed, inverted, or rearranged) to reconstitute the original initial electronic file when the resources are so configured. Additionally, the arrangement of the set of bubbles applied to the initial electronic file may also be copied and stored for later use with any subsequent versions of the same initial file. In some embodiments, the set of bubbles may include a description of each bubble that can be applied to a subsequent version of the initial file to determine a signature for one or more of the bubbles when applied to a subsequent version of the initial file.

At step 850, another, subsequent, or second version of the file (e.g., an electronic file or image) is accessed. The file may be retrieved from a memory or from an external device in a manner similar to step 810. The second file may additionally be provided or retrieved from a source different from the first source and as such may have been changed or modified in a way to question the integrity of the data or information in the second version of the file. The second file may be identified as, or referred to as, a target electronic file. In some embodiments, after receiving the second or target electronic file, a normalization process, similar to or the same as the normalization process applied above, at step 830, may be applied to the second or target electronic file.

At step 860, the arrangement of the same set of bubbles that were applied to the initial electronic file is applied to the second or target electronic file. At step 870. one or more signatures, referred to as second signatures, are determined for the second or target electronic file based on data contained within the set of bubbles as applied, at step 860, in the second or target electronic file. It is worth noting that the determination of the signatures for the second file, at step 870, may include any or all of the same variations and features that were included as part of the determination of the signatures for the initial file as described above, at step 830. For instance, if a normalization process is applied to the initial file, this same normalization process may be applied to the second file as part of accessing the second file, at step 850, or at any point before determining the second signatures, at step 870.

At step 880, a determination is made as to whether one or more regions of change exist in the second or target electronic file based on a comparison of the second signatures for the second or target electronic file and the first signatures for the initial electronic file. The determination, at step 880, may be performed in a processing element of a single device (e.g., processor 110) or may be distributed across more than one processing element in the single device or in multiple devices connected through a communication network. The determination at step 880, can be performed by detecting and/or identifying one or more bubbles that have a second signature determined at step 870, that is different than the first signature determined at step 830.

In some embodiments, a process for determining integrity, such as process 800, may include establishing a threshold value or number that is applied to the difference between the first signature and the second signature. The threshold number may be established based on input from a user through a user interface (e.g., input device 130). or based on a computed characteristic as part of an initial set-up step (e.g., determining the bubble arrangement at step 820). In some embodiments, the threshold number may be preselected when the bubbles are identified in the initial electronic file based on the contents of the bubbles. The threshold number may also be established as part of determining the region of change, at step 880, or as a separate step in the process. Once the threshold number is established and/or determined if a difference between the first signature and the second signature is less than the established threshold number, then this difference is considered a minor difference. In some cases, the type of signature is selected to create similar signatures when the bubbles are similar. As a result, the two signatures will be determined to be the same or similar and the portion of the target electronic file represented by the second signature may not be considered a region of change. Further, if an exact match between the first and second signatures for a bubble is desired, the threshold may be set to zero.

In some embodiments, a process for determining integrity, such as process 800, may include altering one or more of the characteristics associated with the process based on the content in one or more of the bubbles. For instance, a characteristic, such as was described above, of one or more of the bubbles may be altered. Additionally, if a threshold value or number is established, the threshold value or number may be different for one or more of the bubbles with respect to the rest of the bubbles in the set. Further, the determining of the signatures, at steps 830 and 880 may use a different computer algorithm for one or more of the bubbles. The altering of any or all of the characteristics of a bubble associated with the process (e.g., process 800) may also be implemented dynamically as part of the process.

In some embodiments, the determination, at step 880, may include detecting or identifying a portion of a first individual bubble that overlaps a second individual bubble and whether or not there are material differences between the first signature and the second signature for each of the bubbles. For instance, if the second signature of the first individual bubble differs (e.g., is materially different) from the first signature of the first individual bubble and the second signature of the second individual bubble does not differ (e.g., is not materially different) from the first signature of the second individual bubble, then the overlapping region of the bubbles may not be considered a region of change. In a different instance, if the first and second signatures differ for the second individual bubble, the area of overlap of the first individual bubble and the second individual bubble may be considered likely to be the only region of change. Other variations are possible as have been described above. In some embodiments, the number or percentage of bubbles whose first signature differs from (or does not differ materially from) the corresponding second signature may be used to identify a target electronic file that matches, in whole or in part, the initial electronic file.

In some embodiments, the determination of one or more regions of change, at step 880, as part of determining data integrity for a file may include more than one threshold value or number and/or may be based on different types of thresholds for different characteristics. For example, a first type of threshold and threshold number may be established for the difference between the first signature and the second signature for one or more bubbles, as described above. A second type of threshold and threshold number may be established for determining or counting the number of bubbles that have a difference between the first and second signatures. The second type of threshold described here may be used to determine if there are enough regions of change, based on the number of bubbles with a difference, to indicate that the target electronic file is not derived from the initial electronic file (or conversely, to find a representation of an initial electronic file that the target electronic file appears to have been derived from). Effectiveness of the Approach.

The efficiency gained through the use of overlapping bubbles is material. As an illustration, the effectiveness of the improvement of using overlapping bubbles can be computed in comparison with dividing a file into non overlapping bubbles and computing hashes or signatures. As a result, the benefit of increased granularity can be measured against the cost of increasing the number of bubbles due to their overlap. As will be described below and shown in the table defined in FIG. 10 and graph of FIG. 11, the effectiveness of using signatures of overlapping bubbles instead of non-overlapping improves dramatically as the overlap approaches (but does not reach) 50%. Far fewer signatures are needed to maintain the same, granular isolation of areas which are no longer as trustworthy.

Figures 9, 10:
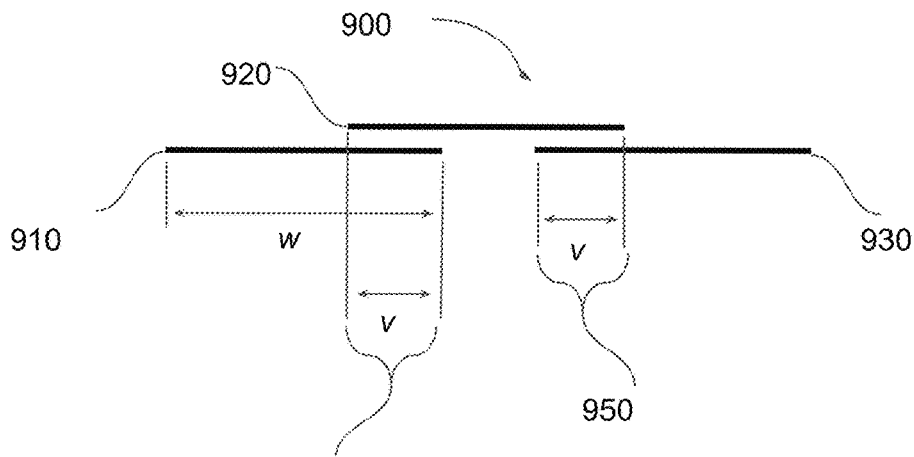
FIG. 9 is a diagram of still a further exemplary arrangement of bubbles associated with data in an electronic file.
FIG. 10 is a table showing values of efficiency for values of percentage overlap of bubbles used for determining integrity of an electronic file using overlapping regions.

FIG. 9 illustrates a diagram of another arrangement 900 of bubbles according to aspects of the present embodiments. Arrangement 900 includes bubbles 910, 920, and 930 configured as one dimensional bubbles, representing lines or columns of data, such as were created by the bubbles shown in FIG. 5. For simplicity, each bubble 910, 920, 930 has a defined width of "w" units. Bubble lines overlap an adjacent bubble line by "v" units, identified as bubble regions 940 and 950.

A manipulated point randomly placed along the bubbles 910, 920, 930 has an approximate probability of 2v/w that it will land in an overlapping area of 2 lines (assuming that v is less than 50% of w). The probability that the randomly placed point will end up in an area with no intersecting lines is therefore 1−(2v/w).

Note that when two bubbles which overlap, such as bubbles 910 and 920, both have failing signatures (signatures that are considered to not match upon later comparison with a second set of signatures), they are presumed to indicate that the manipulation very likely occurred in the overlapping intersection (e.g., region 940), referred to as "more suspect" areas. It is possible, but less likely, that independent manipulation of both adjacent bubbles occurred outside of the intersection.

The resolution, or accuracy of detection of a randomly placed point representing manipulation, is then considered to be v if the point is in an intersecting area (more suspect) and w−2v if an area with no overlap. This is compared to a baseline resolution of w should no overlap be used (e.g. v=0).

Multiplying the likelihood of landing, or not, in an overlap section times the resolution therefore yields a weighted resolution of (2v/w)*v+((1−2v/w)*(w−2v)). This reduces to simply w in the baseline case where v is 0.

The benefit factor of using overlap, resulting in smaller resolution, is inversely proportional to the smaller resolution, so the benefit factor vs the bassline of no overlap is therefore w divided by the weighted resolution, expressed as OverlapBenefit=w/((2v/w)*v+((1−2v/w)*(w−2v)))

Overlapping bubbles, as described in the present embodiments, is not without cost. The number of signatures to compute, store, and test increases for a given set of data as the number of bubbles increases. The increase in cost is expressed as a multiple of the baseline and is CostFactor= (1+v/w). Again, note that the cost factor is simply 1 when v=0.

The effectiveness of using overlapping bubbles is defined as the ratio between the improved resolution and the increased cost. This is expressed as effectiveness=OverlapBenefit/CostFactor.

$$\text{This means effectiveness} =$$
$$(w/((2v/w)*v + ((1-2v/w)*(w-2v))))/(1+v/w)$$
$$\text{Reducing, we see that effectiveness} =$$
$$(w3)/((2wv2) + (w3) - (3vw2) + (6v**3))$$

Figure 11:
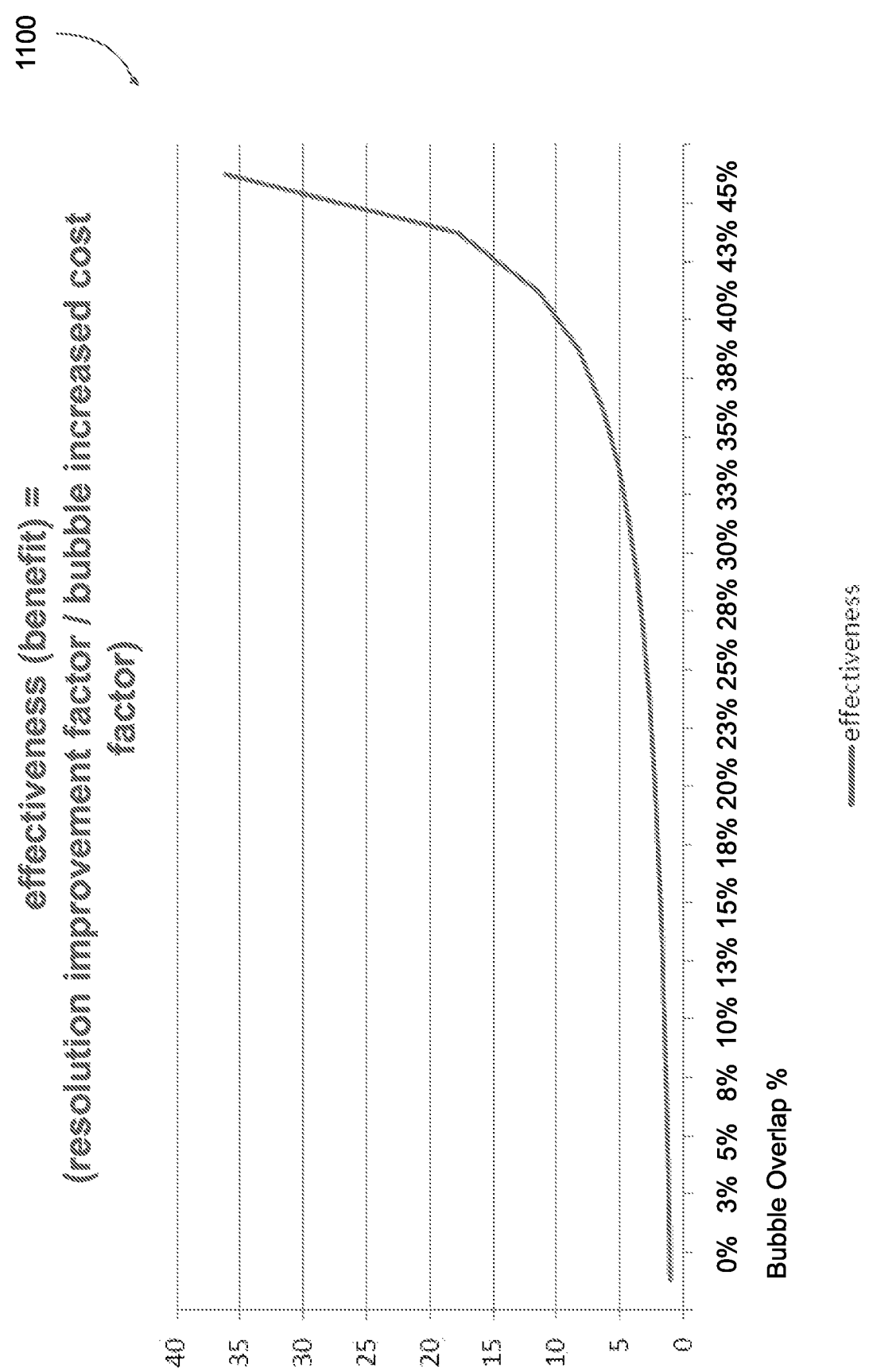
FIG. 11 is a graph showing the efficiency versus the percentage overlap of bubbles used for determining integrity of an electronic file using overlapping regions.

FIG. 10 shows a table 1000 that provides a set of effectiveness values as a function of values for overlap percentage for a given bubble size or width as was described above in FIG. 9. FIG. 11 shows a graph 1100 that illustrates the effectiveness as a function of overlap percentage. The effectiveness increases as one approaches 50% overlap. When bubbles overlap by 48%, 36% fewer signatures are needed than if using non-overlapping bubbles to obtain the same granularity of detection.

It is to be appreciated that, except where explicitly indicated in the description above, the various features shown and described can be considered cumulative and interchangeable, that is, a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments for methods for determining data integrity using overlapping regions, it is noted that modifications and variations can be made by persons skilled in the art in light of the above teachings. It is therefore to be understood that changes may be made in the particular embodiments of the disclosure which are within the scope of the disclosure as outlined by the appended claims.

The invention claimed is:

1. A method for determining changes in an electronic file in a system comprised of at least one processor in communication with at least one storage resource, comprising the steps of:

determining, based on at least one of user input and computed characteristic, at least one of an area of overlap and a percent of overlap of a set of bubbles that is applied to an initial electronic file in order to efficiently locate a change in a target electronic file by balancing a size of an area of detection that includes the change with a number of signatures that are calculated and stored;

determining a first signature for at least one of the bubbles within the set of bubbles applied to the initial electronic file;

copying the first signature for the at least one of the bubbles within the set of bubbles into the at least one storage resource;

accessing a target electronic file;

applying at least one of (a) the set of bubbles and (b) a subset of the set of bubbles to the target electronic file;

determining a second signature for the at least one of the bubbles within the set of bubbles applied to the target electronic file; and determining at least one region of change in the target electronic file by identifying at least one bubble within the set of bubbles having a difference between the second signature and the first signature.

2. The method of claim 1 wherein the step of determining regions of change is further accomplished by identifying a portion of a first bubble, having a material difference between the first signature and the second signature, that overlaps a second bubble, having no material difference between the second signature and the first signature, as not being the region of change.

3. The method of claim 1 further comprising establishing, based on at least one of user input and computed characteristic, a threshold number that is applied to the difference between the first signature and the second signature for the at least one bubbles, wherein if this difference is less than the threshold number, the first signature and the second signature are determined to be the same.

4. The method of claim 1 further comprising determining if a number of signatures from a second set of signatures that materially match signatures from a first set of signatures is greater than at least one of a user determined percentage and a computed percentage.

5. The method of claim 1 wherein at least one of (i) a characteristic of at least one bubble, wherein the characteristic includes at least one of size, shape, placement, density, and percent overlap of the at least one of the bubbles within the set of bubbles, (ii) a threshold number applied to the difference between the first signature and the second signature of the at least one bubble, and (iii) a computer algorithm for determining a signature of the at least one of the bubbles is altered based on content of the at least one of the bubbles within the set of bubbles.

6. The method of claim 1 wherein the step of determining a set of bubbles includes selecting at least one characteristic of size, shape, placement, and density of the at least one of the bubbles within the set of bubbles.

7. The method of claim 1 wherein the step of determining a set of bubbles includes varying at least one characteristic of at least one of the bubbles, wherein the at least one characteristic includes at least one of size, shape, placement, density, and percent overlap of the at least one of the bubbles within the set of bubbles.

8. The method of claim 1 further comprising applying a normalization process to the initial electronic file before the step of determining a first signature and wherein the step of accessing the target electronic file includes applying the normalization process to the target electronic file.

9. The method of claim 1 wherein the step of determining regions of change is further accomplished by identifying a portion of the first bubble, having a material difference between the second signature and the first signature, that overlaps a second bubble, having a material difference between the second signature and the first signature, as being the likely region of change.

10. The method of claim 1 wherein the step of determining the first signature for the at least one of the bubbles and the step of determining the second signature for the at least one of the bubbles is calculated only using tripwire data contained within the at least one of the bubbles within the set of bubbles.

11. The method of claim 2 wherein the first and second bubbles are parallelograms in shape thereby efficiently determining the overlapping portion of the first bubble as not being the region of change.

12. A method for identifying a target electronic file that is similar to an initial electronic file in a system comprised of at least one processor in communication with at least one storage resource, comprising the steps of:
determining, based on at least one of user input and computed characteristic, at least one of an area of overlap and a percent of overlap of a set of bubbles that is applied to the initial electronic file in order to efficiently locate a change in a target electronic file by balancing a size of an area of detection that includes the change with a number of signatures that are calculated and stored, the determining including establishing a first threshold number and a second threshold number associated with the set of bubbles that is applied to identify at least one initial electronic file that is similar to the target electronic file;
determining a first signature for at least one of the bubbles applied to the initial electronic file;
copying the first signature for the at least one of the bubbles into the at least one storage resource;
accessing the target electronic file;
applying the set of bubbles to the target electronic file;
determining a second signature for the at least one of the bubbles applied to the target electronic file; and
determining if a difference between the first signature and the second signature for the at least one of the bubbles is less than the first threshold number and if the number of bubbles with a difference between the first signature and the second signature is less than the second threshold number.

13. An apparatus for determining changes in an electronic file having at least one processor in communication with at least one storage resource and a computer-readable storage medium containing stored instructions that when executed by the at least one processor causes the at least one processor to:
determine, based on at least one of user input and computed characteristic, at least one of an area of overlap and a percent of overlap of a set of bubbles that is applied to an initial electronic file in order to efficiently locate a change in a target electronic file by balancing a size of an area of detection that includes the change with a number of signatures that are calculated and stored;
determine a first signature for at least one of the bubbles applied to the initial electronic file;
copy the signature for the at least one of the bubbles into the at least one storage resource;
access a target electronic file;
apply the set of bubbles to the target electronic file;
determine a second signature for the at least one of the bubbles applied to the target electronic file; and
determine a region of change in the target electronic file by identifying at least one bubble within the set of bubbles having a difference between the second signature and the first signature.

14. The apparatus of claim 13 wherein the processor further determines a region of change by identifying a portion of a first bubble, having a material difference between the second signature and the first signature, that overlaps a second bubble, having no material difference between the second signature and the first signature, as not being the region of change.

15. The apparatus of claim 13 wherein the processor determines the set of bubbles by selecting at least one characteristic of size, shape, placement, and density, of the at least one of the bubbles within the set of bubbles.

16. The apparatus of claim 13, wherein the stored instructions further cause the at least one processor to apply a normalization process to the initial electronic file before the step of determining a first signature and further apply the normalization process to the target electronic file as part of accessing the target electronic file.

17. The apparatus of claim 13, wherein the stored instructions further cause the at least one processor to establish, based on at least one of user input and computed characteristic, a threshold number that is applied to the difference between the first signature and the second signature for the at least one of the bubbles, wherein if the difference is less than the threshold number, the first signature and the second signature are determined to be the same.

18. The apparatus of claim 13 wherein the processor further determines a region of change by identifying a portion of a first bubble, having a material difference between the second signature and the first signature, that overlaps a second bubble, having a material difference between the second signature and the first signature, as being a likely region of change.

19. The apparatus of claim 13 wherein the processor is configured to determine at least one of the first signature for the at least one of the bubbles and the second signature for the at least one of the bubbles by calculating using only tripwire data contained in the at least one bubble within the set of bubbles.

20. The apparatus of claim 14 wherein the first and second bubbles are parallelograms in shape thereby efficiently determining the overlapping portion of the first bubble as not being the region of change.

21. A system for efficiently storing a representation of an initial electronic file comprising
at least one storage resource in communication with at least one processor configured to receive and store at least a first set of signatures that is determined from a set of bubbles applied to the initial electronic file, wherein the first set of signatures requires less storage space than the initial electronic file and the first set of signatures cannot be reversed to reconstitute the initial electronic file, wherein at least one of an area of overlap and a percent of overlap of the set of bubbles is determined by selecting at least one of user input and computed characteristic;
the at least one processor is further configured to:
access a target electronic file,
determine a second set of signatures, based on the set of bubbles being applied to the target electronic file; and
determine if at least one of (a) at least one signature from the second set of signatures materially differs from at least one corresponding signature from the first set of signatures and (b) a number of signatures from the second set of signatures that materially match signatures from the first set of signatures is greater than at least one of a user determined percentage and a computed percentage.

22. The system of claim 21 wherein the set of bubbles further includes a set of characteristics that can be applied to the target electronic file to determine the second set of signatures, wherein the characteristics include at least one of size, shape, placement, and density of at least one of the bubbles within the set of bubbles.

23. A method for determining changes in an electronic file in a system comprised of at least one processor in communication with at least one storage resource, comprising the steps of:
- determining, based on at least one of user input and computed characteristic, a set of bubbles that are applied to an initial electronic file, the set of bubbles including at least one of an area of overlap and a percent of overlap of the set of bubbles in order to efficiently locate a change in the target electronic file by balancing a size of an area of detection with a number of signatures that are calculated and stored;
- determining a first signature for at least one of the bubbles within the set of bubbles applied to the initial electronic file;
- copying the first signature for the at least one of the bubbles within the set of bubbles into the at least one storage resource;
- accessing a target electronic file;
- applying at least one of (a) the set of bubbles and (b) a subset of the set of bubbles to the target electronic file;
- determining a second signature for the at least one of the bubbles within the set of bubbles applied to the target electronic file; and
- determining at least one region of change in the target electronic file by identifying at least one bubble within the set of bubbles having a difference between the second signature and the first signature.

* * * * *